United States Patent [19]

Cerboni

[11] 4,135,872
[45] Jan. 23, 1979

[54] SUPPORTING DEVICE FOR POURING DIES, IN PARTICULAR FOR POURING DIES USED IN PLANTS FOR MAKING CHOCOLATE ITEMS

[75] Inventor: Renzo Cerboni, Milan, Italy

[73] Assignee: Carle & Montanari S.p.A., Milan, Italy

[21] Appl. No.: 762,887

[22] Filed: Jan. 27, 1977

[30] Foreign Application Priority Data

Jul. 12, 1976 [IT] Italy ................. 25215 A/76

[51] Int. Cl.² ............................................. A23G 1/26
[52] U.S. Cl. ...................................... 425/453; 198/648
[58] Field of Search ............... 198/472, 648; 425/453, 425/182, 195

[56] References Cited

U.S. PATENT DOCUMENTS

| | | | |
|---|---|---|---|
| 2,397,698 | 4/1946 | Sigler | 198/648 |
| 2,925,902 | 2/1960 | Bianchi | 425/453 |
| 2,938,621 | 5/1960 | Aasted | 198/648 |
| 3,082,709 | 3/1963 | Jacobsen | 425/453 X |
| 3,150,765 | 9/1964 | Ellis | 198/648 |
| 3,587,829 | 6/1971 | Sorensen | 198/648 |
| 3,981,656 | 9/1976 | Steels et al. | 425/453 X |

FOREIGN PATENT DOCUMENTS

| | | | |
|---|---|---|---|
| 62521 | 8/1944 | Denmark | 425/453 |
| 1104806 | 12/1958 | Fed. Rep. of Germany | 425/453 |
| 2280568 | 7/1974 | France | 198/648 |

Primary Examiner—William R. Briggs
Attorney, Agent, or Firm—Ralph W. Kalish

[57] ABSTRACT

In combination with a conveyor having spaced apart chain sections, at least one transversely aligned pair of support elements projecting toward each other from the respective chain section, a clamping member slideably engaged on each support element for reciprocal movement axially thereof and with the chain-remote portions of said clamping members being spaced from each other, resilient elements urging said clamping members toward each other, and a pouring die for removable disposition between said clamping members substantially intermediate said chain sections; the pouring die having integral cooperating components for detachable coupling engagement with said clamping members.

10 Claims, 4 Drawing Figures

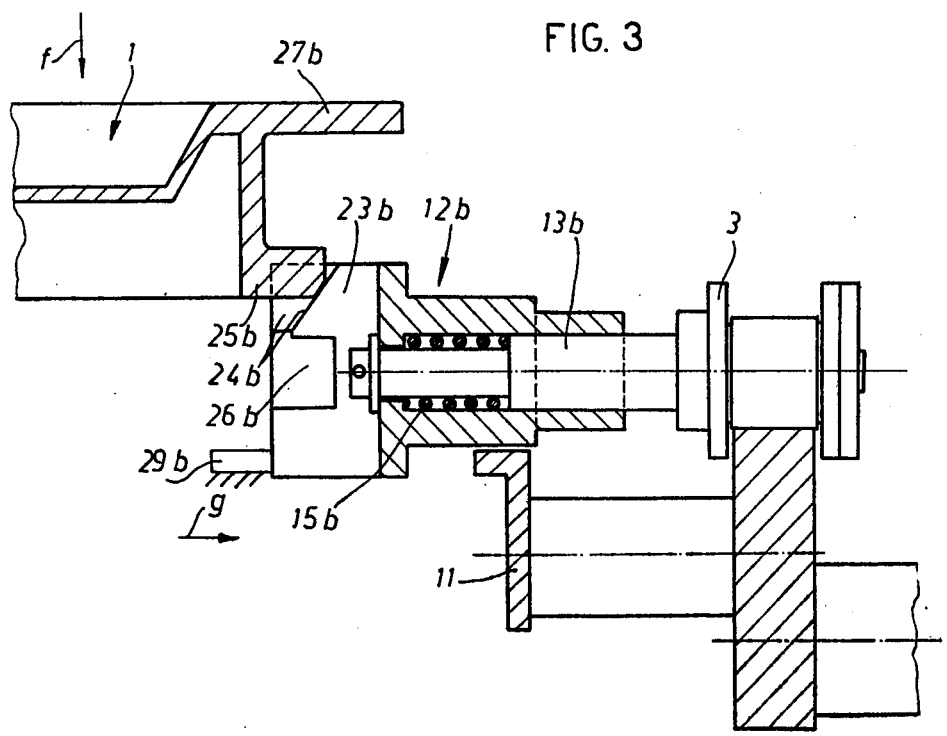
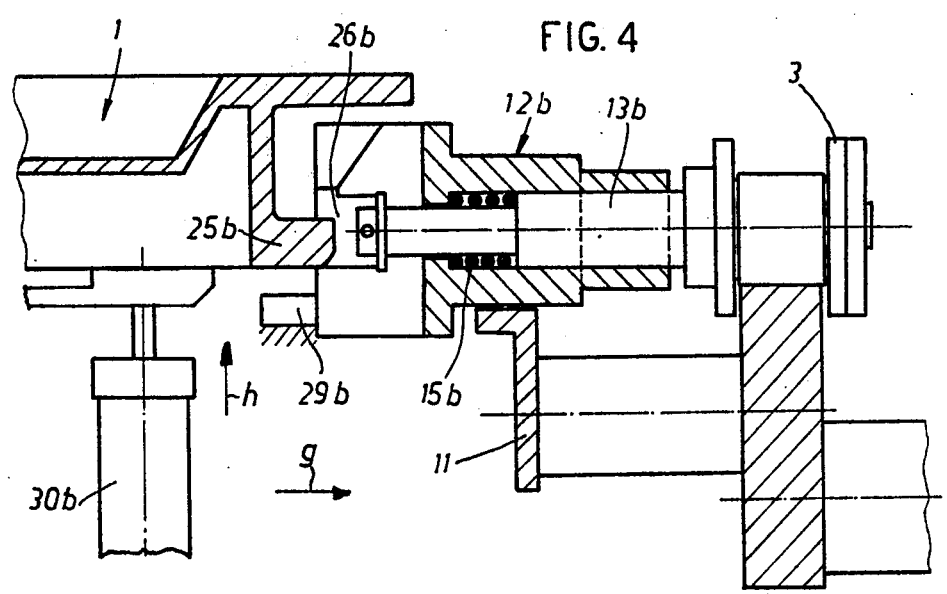

SUPPORTING DEVICE FOR POURING DIES, IN PARTICULAR FOR POURING DIES USED IN PLANTS FOR MAKING CHOCOLATE ITEMS

The here outlined invention relates to a supporting device for pouring dies, in particular for pouring dies used in chocolate making industries.

It is known that until now the pouring dies here mentioned were seated in so-called die holders connected to conveying chains running parallel to both sides thereof.

BACKGROUND AND SUMMARY OF THE INVENTION

The trouble of the said die-holder frames used in this art is their rather high cost and high weight, in particular when considering that an industry for making chocolate items may use up to 1500 pouring dies complete with the respective die holders.

Another difficulty regarding the use of the above die-holder frames is given by the replacement of the pouring dies when it is wished to change the model to be poured or the product to be made (weight, blend or different shape of the finished product). In this case the pouring dies must be manually extracted from the die-holder frame to be replaced by dies of different pouring pits.

In addition, in the zone in which the poured product is subjected to the vibration step, we have the further drawback that the die, the die-holder frame and the conveyor chains are all subjected to this vibration with the therefrom ensuing generation of troublesome noise, the wearing-out of the mechanical components, while, at the same time, the efficiency of the vibrators is reduced by the impossibility of acting directly onto the die.

Further still, because of the considerable weight of the die-holder frame, the motive power required for driving the conveyor means is rather high; in addition there are negative effects regarding the thermal treatment of the dies and the product contained therein (cooling-heating) requiring thus cooling means and heating means of a considerable power.

It has already been tried before to avoid the use of the die-holder frame by placing the pouring dies freely onto supporting brackets connected to the conveyor chains.

The drawback of the known means for the free support of the pouring dies lies in the fact that it is still necessary to replace the dies by hand, that pouring dies are not locked in a safe manner to the conveying chains and that the turning over of the dies is not possible without the use of complicated auxiliary means ensuring, during the die turnover phase, the safe connection between the pouring dies and the conveyor chains.

Object of the present invention is a supporting device for pouring dies of the above-mentioned kind allowing to obviate the drawbacks part of the of the present state of the art, allowing in particular to abolish the die-holder frames, to replace automatically the pouring dies, to apply the required vibration phase directly onto the pouring dies without any vibration of the conveyor chains, reducing at the same time not only the weight but also the mass of the pouring forms together with the respective supporting device and assuring the safe operation of the supporting device also during the turnover phase of the pouring die, the whole with the perfect positioning respectively blocking of the pouring dies with regard to the conveyor chains.

The object, essential part of the present invention, is obtained by the conveyor chains for the pouring dies being provided with supporting means, each of which having a connecting and supporting section which engages a locking section provided along the sides of the dies and parallel to the conveyor chains, with each connecting and supporting section being moveable between the corresponding chain and die and being controlled by a spring.

Further details of this invention can be taken from the following description and claims and the accompanying drawings.

The object according to this invention will now be described in detail on hand of a preferred embodiment thereof given by way of example without being limited thereto and the accompanying drawings in which:

BRIEF DESCRIPTION OF THE DRAWINGS

FIG. 3 is a cross-section of the right-hand part of the pouring die with supporting and clamping device during the connection phase; and FIG. 4 shows a cross-section of the right-hand part of the pouring die and the supporting and clamping device during the die ejection phase.

DESCRIPTION OF THE PREFERRED EMBODIMENT

Figure 1:
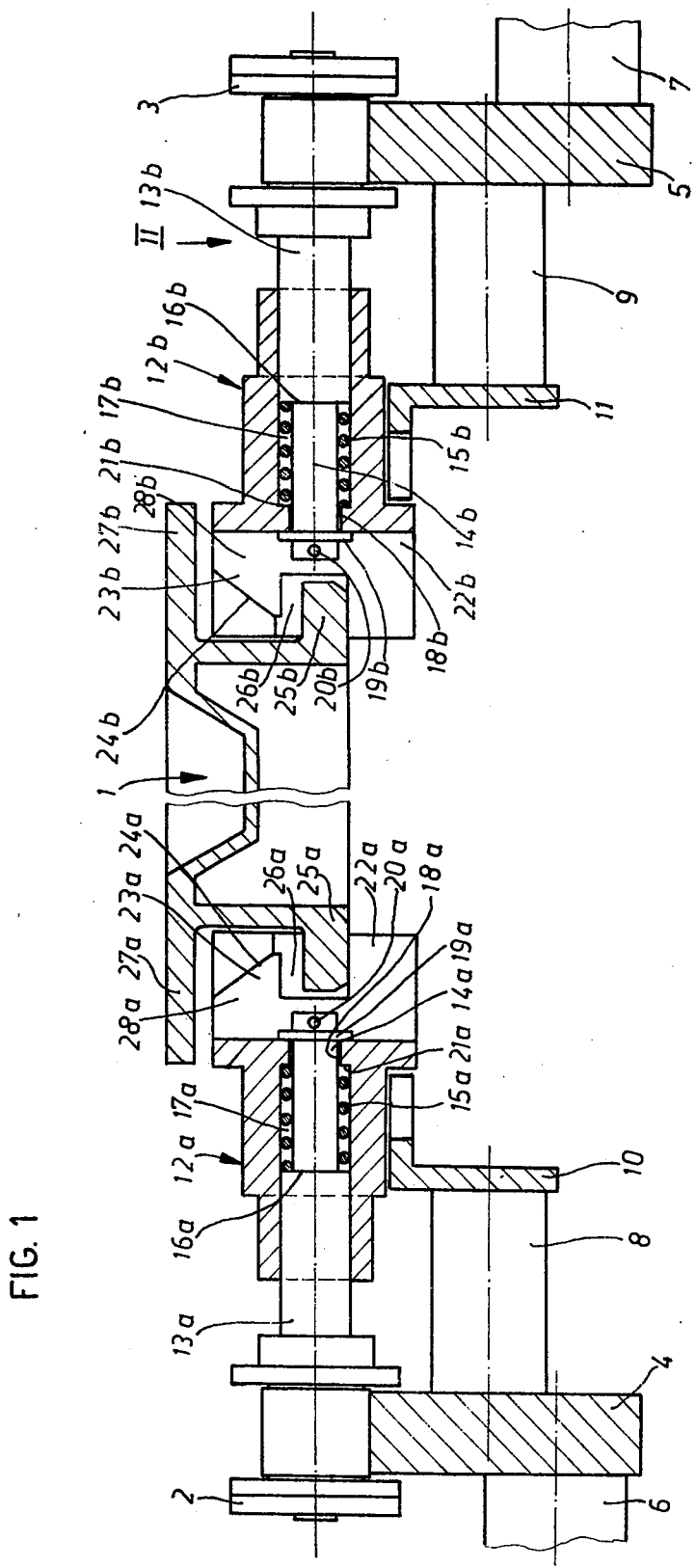
FIG. 1 shows a pouring die with the respective supporting and clamping devices, as well as the conveyor chains, in cross-section along line I—I of FIG. 2.

As clearly shown in FIG. 1, each pouring die 1, in particular each pouring die for the making of chocolate products, is carried forward by parallel conveyor chains 2 and 3 moving in known manner on guides 4 and 5 carried by a framework 6, 7.

From the side of the guides 4, 5 opposite of the carrying structure 6, 7, project intermediate pieces 8, 9 with further guide means 10, 11 at the free ends, consisting advantageously of L-like sections. The supporting and clamping means 12a and 12b are sliding on the said guides 10, 11.

Both the left-hand device 12a and the right-hand device 12b (FIG. 1) consist of identical structural components arranged however purposedly in opposite manner. For reason of clearness, these identical structural components are indicated, in addition to the common reference number, with an (a) when on the left and a (b) when on the right.

Each supporting and clamping device 12a, 12b consists of a supporting means 13a, 13b, for example a pivot integral part of chains 2 resp. 3. The pivots 13a, 13b have a tapering 14a, 14b at the front for receiving spring means 15a, 15b, blocked at one side by ledges 16a, 16b formed by the thicker part of the pivots 13a, 13b. Each supporting device 12a, 12b has a longitudinal hole 17a, 17b of such a size as to allow the movement of 12a, 12b with respect to the pivots 13a, 13b. The said holes 17a, 17b are joined at the front to the holes 18a, 18b with a diameter corresponding approximately to that of the front parts 14a, 14b allowing through the said holes 18a, 18b and with the help of washers 19a, 19b and cross pins 20a, 20b to clamp the supporting devices 12a, 12b with respect to the pivots 13a, 14a, 13b, 14b, enclosing the springs 15a, 15b.

The said holes 18a, 18b having a reduced diameter form in addition also a ledge means 21a, 21b for the spring means 15a, 15b. The said spring means 15a, 15b is preferably formed of a helical pressure spring which, when assembled with a given preload within the holes 17a, 17b, tends to push the supporting device 12a, 12b always against the die 1. The parts of the device 12a, 12b turned toward the die 1 have a C-shaped section, whose lower flanges 22a, 22b form the supporting surface for the die 1, while the upper flanges 23a, 23b, shaped like a hook has inclined planes 24a, 24b acting as guiding device.

As shown in FIG. 1, the die 1 has along the sides turned toward the supporting and clamping devices 12a, 12b a C-like profile facing the profiles 22a, 23a, 22b, 23b. The lower flanges 25a, 25b of the die 1 are so shaped as to rest securely on the flanges 22a, 22b of the supporting devices 12a, 12b, while the recesses 26a, 26b receive the flanges 25a, 25b of the die 1 leaving a given clearance at the top. The upper flanges 27a, 27b of the die 1 are rather large so as to cover completely the front part of the supporting devices 12a, 12b. This has the advantage of preventing the penetration of dirt into the C sections during the pouring phase of the chocolate mass, dirt which could prevent the safe operation of the device 12a, 12b.

Figure 2:
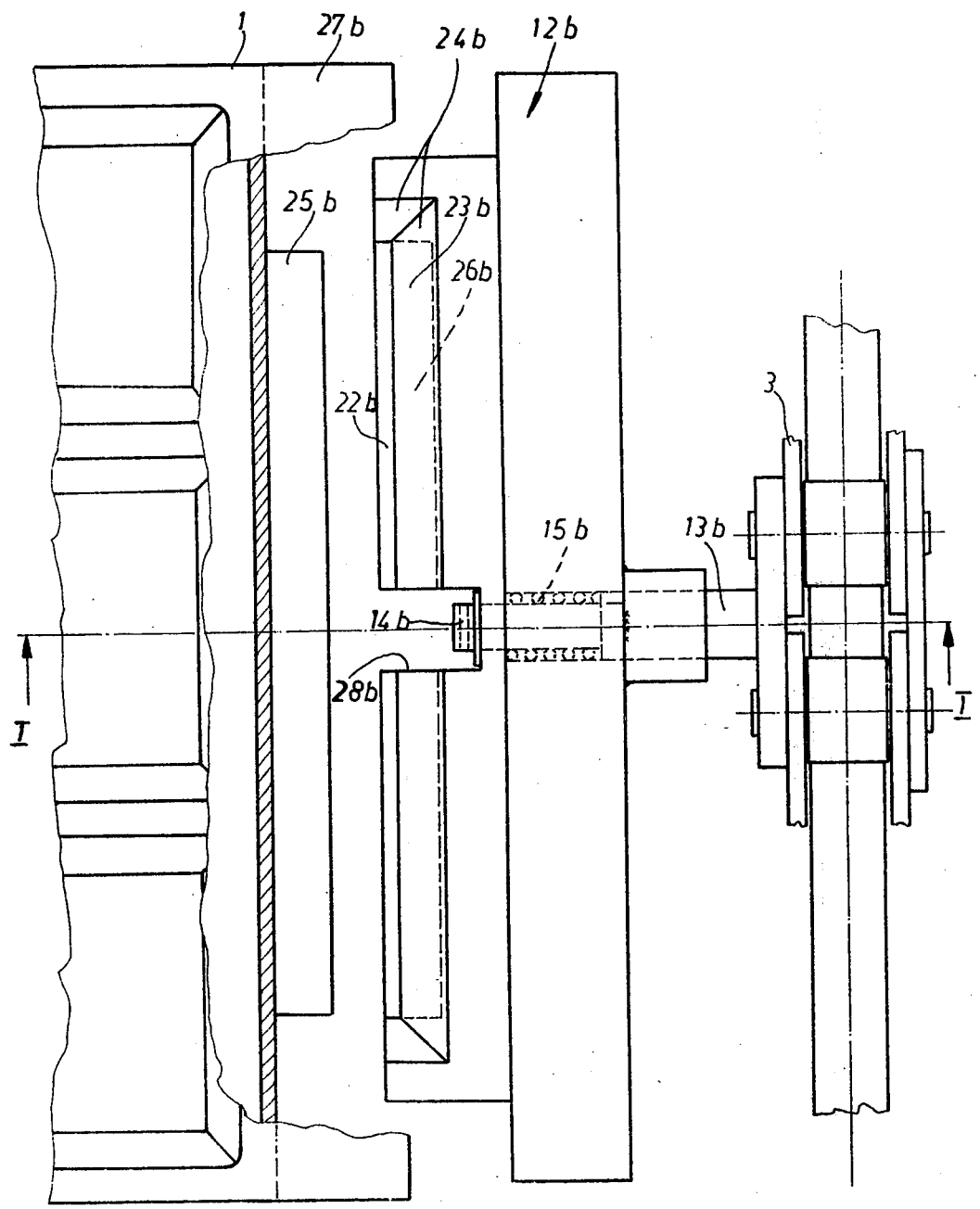
FIG. 2 shows a plan view, in part in cross-section of a detail of the die with the supporting device not assembled and looked at in direction of the arrow of FIG. 1.

In FIG. 2 a plan view shows the right-hand end of die 1 with the appurtenant supporting and clamping device 12b driven by the chain 3. In this figure, die 1 and the device 12b are shown separated to make the details clearer.

While the top flange 27b of die 1 runs along the whole width of the die, the bottom flange 25b is reduced in size to ensure the safe insertion of the flange 25b into the recess 26b formed between the lower flange 22b of the device 12b and the upper flange 23b, characterised in addition by the inclined locking surfaces 24b.

While the cavity 26b of the device 12b allows a certain variation in height of the die 1 (FIG. 1), for example to render the vibration step more efficient, the flange 25b has a length which does not allow, after the insertion of the flange 25b into the recess 26b, any displacement of the die 1 in cross-wise direction.

At the front part 14b of the pivot 13b, the section is interrupted by a recess 28b so cut back as to allow the axial movement of the device 12b on the pivot 13b against the thrust exerted by the spring means 15b and in direction of the conveyor chain 3.

In FIG. 3 we see the right-hand part of a die 1 in section together with a supporting and clamping device 12b during the assembly phase.

As shown in FIG. 3, the die 1 is made to rest with its lower flange 25b, preferably provided with a locking chamfer, on the inclined locking surfaces 24b of the front part of the supporting device 12b.

The device 12b is made to move in direction of the arrow g by means of a section 29b, a cam or similar auxiliary fitting, against the thrust of the spring means 15b. To allow a free movement in direction of the arrow g, the sliding flange of the side guide 11 results to be shortened. When displacing the supporting device 12b on the pivot 13b approximately up to inner part of the chain 3, the flange 25b of the die 1 moves over the inclined surface 24b of the front part 23b having a hook-like shape, snapping-in into the recess 26b and remaining seated on the lower surface of the said recess. Successively, the spring 15b moves the supporting device 12b back into the position shown in FIG. 1, thus blocking the die 1 in cross-wise direction allowing it in the same time to move up and down in the recess 26b.

The upper flange 27b of the die 1 is preferably larger than the lower flange 25b protecting thus the front part 23b of the supporting device 12b from dirt.

FIG. 4 shows the ejection of die 1 from the clamping device 12b.

This phase is obtained, for example by means of a cam or similar component 29b, moving the supporting device 12b against the pressure of the spring 15b in direction of arrow g, so as to release the lower flange 25b of die 1. Again, to allow the free movement of the device 12b on the pivot 13b, the L-like guide 11 has the upper flange width reduced. After releasing the lower flange 25b from its engagement with the recess 26b of the supporting device 12b, the stamp 1, by means of hydraulic or pneumatic cylinders 30b or similar means is displaced in direction of the arrow h thus releasing the device 12b, thus allowing the automatic ejection of the dies 1 from the appurtenant supporting devices 12b.

Preferably, the dies 1 to be used with the supporting device 12b are kept in a magazine above the supporting devices 12a, 12b, while the dies ejected from the supporting devices 12a, 12b are stored in similar magazines above the dies 1. To allow the loading of the dies 1 without interrupting the continuous motion of the chains 2 and 3, the said magazines are preferably placed on an alternatingly moving slide synchronised with the motion of the die 1 supporting device 12a, 12b chains 2 and 3. Thus, when the movement is in accordance with that of the dies 1, the latter can be loaded onto the supporting devices 12a, 12b or respectively, discharged from the said devices. Successively, the loading magazines return to the starting position over the supporting device 12a, 12b to be loaded or discharged as required.

I claim:

1. In a confectionery molding system the combination of a conveyor and a pouring die having a mold cavity detachably coupled therewith wherein said conveyor comprises first and second transversely spaced-apart chains, an elongated base component fixed in the outer portion thereof to each chain and projecting inwardly therefrom toward the opposite chain in transversely aligned relationship, a die-engageable member having a body portion slideably received on each base component, resilient means biasing the related die-engageable member inwardly endwise of the associated elongated base component, a latch element provided at the inner end of each die-engageable member and constituting a keeper opening inwardly, said pouring die having a body and being disposed between the opposed die-engageable members, latch-forming flanges extending laterally from opposite sides of said pouring die for reception within the keepers of the proximate die-engageable members for effecting detachable coupling of said conveyor and said pouring die, each latch-forming flange having a cross-section less than the cross-section of the associated keeper to permit axial rocking and rotary movement of said latch-forming flanges within the associated keepers so that vibratory movement may be imparted to said pouring die without translation to said conveyor chains, said latch-forming flanges and said keeper being configured to prevent inversion of said pouring die by any reversal of direction of travel of said conveyor.

2. The combination as defined in claim 1 and further characterized by each die-engageable member having a sleeve-forming portion slideably received on the related base component, and said resilient means comprising a spring encircling each base component interiorly of the sleeve-forming portion of the related die-engageable member for biasing the latter inwardly endwise of the associated elongated base component for securing said pouring die in reliable operative relationship with respect to the conveyor and permitting facile withdrawl of the pouring die from such condition through stressing of each of said springs for permitting withdrawing of said die-engageable members outwardly endwise of the related base component a distance sufficient for such pouring die removal and for reception of a succeeding pouring die.

3. The combination as defined in claim 1 and further characterized by each keeper portion being substantially C-shaped in vertical cross-section and the latch-forming flanges on said pouring die having less height and width than the bight portion of the related keeper portions.

4. The combination as defined in claim 1 and further characterized by each keeper portion having upper and lower vertically spaced-apart flanges and an intervening vertically extending web, and said latch-forming flanges being of less vertical thickness than the distance between said keeper portion upper and lower flanges.

5. The combination as defined in claim 4 and further characterized by said keeper portions' upper flanges having a cam surface, a cam follower provided on said latch-forming flanges for coaction with said keeper cam surfaces during movement of said pouring die into, and from, coupled relationship between the keeper portions and the related latch-forming flanges.

6. The combination as defined in claim 1 and further characterized by said pouring die having a protective flange extending laterally from the upper portion of the body thereof, spacedly above the associated latch-forming flanges a distance sufficient to overlie the adjacent keeper portion of the proximate die-engageable members when said pouring die and said conveyor are in coupled condition.

7. In a confectionery molding system the combination of a conveyor and a pouring die having a mold cavity wherein said conveyor comprises first and second transversely spaced apart components, said first and second components respectively having first and second portions aligned transversely of said conveyor, first and second die-support means extending respectively from said first and second components toward each other in aligned relationship, said first and second die-support means terminating at the proximate or inner ends thereof spacedly from each other, said pouring die having a body for removable disposition between said first and second die-support means substantially intermediate said components, cooperative coupling means comprising a keeper provided on the inner end of each die-support means, and being substantially C-shaped in cross-section having upper and lower vertically spaced apart flanges and an intervening vertically extending web, said keepers opening toward said pouring die, and a latch-forming flange formed on each side of said pouring die and projecting laterally outwardly therefrom for locking reception within the bight portion of the related keeper, said latch-forming flanges being of less vertical thickness than the distance between the upper and lower flanges of said keepers, and means permitting of relative movement of said keepers and the associated latch-forming flanges toward and away from each other for selected coupled or uncoupled condition of said pouring die.

8. The combination as defined in claim 7 and further characterized by said keeper portion upper flange having a cam surface, a cam follower provided on said latch-forming flange for coaction with said cam surface during travel of said pouring die into, and from, coupled relationship between said keeper portion and said latch-forming portion.

9. The combination as defined in claim 7 and further characterized by said pouring die having a protective flange extending laterally from the upper portion thereof and being spaced above the latch-forming portion a distance sufficient to overlie the keeper portion when said coupling means is in engaged condition.

10. The combination as defined in claim 7 and further characterized by said pouring die having a protective flange extending laterally from the upper portion thereof and being located spacedly upwardly of said keeper portion upper flange when said coupling means is in engaged condition, said protective flange being of greater width and length than said latch-forming flange, and being of such width and length relative to said keeper portion to serve to prevent accidental flow of work material there into.

* * * * *